US011511881B2

(12) United States Patent
Toews et al.

(10) Patent No.: US 11,511,881 B2
(45) Date of Patent: Nov. 29, 2022

(54) SYSTEM AND METHOD TO FACILITATE COMMUNICATION OF AN APPLICATION RESIDENT ON A PORTABLE COMPUTING DEVICE WITH AN APPLICATION RESIDENT IN AIRCRAFT AVIONICS

(71) Applicant: HONEYWELL INTERNATIONAL INC., Morris Plains, NJ (US)

(72) Inventors: Philip Toews, Phoenix, AZ (US); Robert Brownlee, Glendale, AZ (US); John Beckwith, Westport, CT (US); Richard Snyder, Phoenix, AZ (US); Rajeev Mohan, Bangalore (IN); Lior Attias, Scottsdale, AZ (US); Salvatore Bottiglieri, Phoenix, AZ (US); Daniel E. Lewis, Glendale, AZ (US); Helen Edelson, Atlanta, GA (US); Parker LeBlanc, Mesa, AZ (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 336 days.

(21) Appl. No.: 16/809,247

(22) Filed: Mar. 4, 2020

(65) Prior Publication Data
US 2020/0407075 A1 Dec. 31, 2020

(30) Foreign Application Priority Data

Jun. 28, 2019 (IN) .............................. 201941025848

(51) Int. Cl.
*B64D 45/00* (2006.01)
*G08G 5/00* (2006.01)
(Continued)

(52) U.S. Cl.
CPC .............. *B64D 45/00* (2013.01); *G06F 8/70* (2013.01); *G08G 5/003* (2013.01); *G08G 5/0021* (2013.01);
(Continued)

(58) Field of Classification Search
CPC ...................................................... B64D 45/00
See application file for complete search history.

(56) References Cited

U.S. PATENT DOCUMENTS 8,695,053 B2 * 4/2014 Huang ................ H04L 65/4076
725/110
9,334,063 B2 * 5/2016 Baumgarten ...... G05B 23/0216
(Continued)

FOREIGN PATENT DOCUMENTS

| EP | 2819317 A2 | 12/2014 |
|---|---|---|
| EP | 3316127 A1 | 10/2017 |
| WO | 2013/013243 A1 | 1/2013 |

OTHER PUBLICATIONS

UTC Aerospace Tablet Electronic Flight Bag (Year: 2017).*
(Continued)

*Primary Examiner* — Michael A Berns
(74) *Attorney, Agent, or Firm* — Lorenz & Kopf, LLP

(57) ABSTRACT

A system includes an aircraft avionics system and a portable computing device. The aircraft avionics system is configured to run one or more embedded avionics applications. The portable computing device is in operable communication with the aircraft avionics system and is configured to run one or more portable device applications. Each portable device application has resident therein a software development kit having libraries and utilities that enables the portable device application to: establish a secure connection with the aircraft avionics system, establish and maintain a required protocol with the embedded avionics application, and communicate with the embedded avionics application as specified by an application programming interface definition.

18 Claims, 4 Drawing Sheets

(51) Int. Cl.
  H04B 7/185   (2006.01)
  H04L 67/12   (2022.01)
  G06F 8/70    (2018.01)

(52) U.S. Cl.
  CPC ......... H04B 7/18506 (2013.01); H04L 67/12 (2013.01); B64D 2045/0075 (2013.01)

(56) References Cited

U.S. PATENT DOCUMENTS

| | | | |
|---|---|---|---|
| 9,335,796 | B2 | 5/2016 | Ribich |
| 9,980,298 | B2 * | 5/2018 | Batsakes ................. H04W 4/90 |
| 10,207,815 | B2 | 2/2019 | Haukom et al. |
| 10,225,349 | B2 * | 3/2019 | Dusik ..................... H04L 67/12 |
| 10,960,985 | B2 * | 3/2021 | Johnson ................. G06F 21/44 |
| 2015/0019862 | A1 | 1/2015 | Uczekaj et al. |
| 2019/0149404 | A1 | 5/2019 | Toews et al. |
| 2019/0311632 | A1 | 10/2019 | Hochwarth et al. |
| 2020/0396250 | A1 * | 12/2020 | Nguyen .............. H04L 41/0226 |
| 2020/0407075 | A1 * | 12/2020 | Toews ..................... H04L 67/12 |

OTHER PUBLICATIONS

GE Aviation, "Avionica Close to Gaining Approval for FMS-EFB Connection," Aviation Week & Space Technology, Mar. 6, 2019.
UTC Aerospace Systems, Tablet Interface Module (TIM), Mar. 2018.
Thurber, Matt, "ASIG FlyTab Turns iPads Into Class 2 EFBs," AINonline, May 14, 2014.

* cited by examiner

SYSTEM AND METHOD TO FACILITATE COMMUNICATION OF AN APPLICATION RESIDENT ON A PORTABLE COMPUTING DEVICE WITH AN APPLICATION RESIDENT IN AIRCRAFT AVIONICS

CROSS-REFERENCE TO RELATED APPLICATION

The present application claims benefit of prior filed Indian Provisional Patent Application No. 201941025848, filed Jun. 28, 2019, which is hereby incorporated by reference herein in its entirety.

TECHNICAL FIELD

The present invention generally relates to aircraft avionics, and more particularly relates to communication between applications resident on a device and applications resident in aircraft avionics.

BACKGROUND

Aircraft avionic systems include various communication, navigation, and display systems that implement various features and functions such as, for example, flight management. These features execute on hardware resident within the aircraft avionics and may thus be referred to as "embedded features." The technological advances in interconnectivity make it desirable to allow applications that are not resident within the aircraft avionics hardware (e.g., nonresident applications) to communicate with the embedded features. However, the communication between nonresident applications and the embedded features is difficult and complex. This, in part, is due to the security details, the defined protocol, and various application programming interfaces (APIs) that define the data allowed to be transferred.

Hence, there is a need for a system and method that facilitates communication of applications with embedded avionics. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

The system and method described herein facilitates communication of applications with embedded avionics by making the avionics connection features available in a software development kit (SDK) for application developers ease in use.

In one embodiment, a system includes an aircraft avionics system and a portable computing device. The aircraft avionics system is configured to run one or more embedded avionics applications. The portable computing device is in operable communication with the aircraft avionics system and is configured to run one or more portable device applications. Each portable device has resident therein a software development kit having libraries and utilities that enables the portable device application to: establish a secure connection with the aircraft avionics system, establish and maintain a required protocol with the embedded avionics application, and communicate with the embedded avionics application as specified by an application programming interface definition.

In another embodiment, an electronic flight bag includes a processor that is configured to run one or more electronic flight bag applications. Each electronic flight bag as resident therein a software development kit having libraries and utilities that enable the electronic flight bag to: establish a secure connection with an aircraft avionics system that is configured to run an embedded avionics application, establish and maintain a required protocol with the embedded avionics application, and communicate with the embedded avionics application as specified by an application programming interface definition.

In yet another embodiment, a computer-readable program product comprises a software development kit having libraries and utilities, and the software development kit, when compiled on a portable computing device that is configured to run a portable device application, is resident within the portable device, and enables the portable computing device to: establish a secure connection with an aircraft avionics system that is configured to run an embedded avionics application, establish and maintain a required protocol with the embedded avionics application, and communicate with the embedded avionics application as specified by an application programming interface definition.

Furthermore, other desirable features and characteristics of the disclosed system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
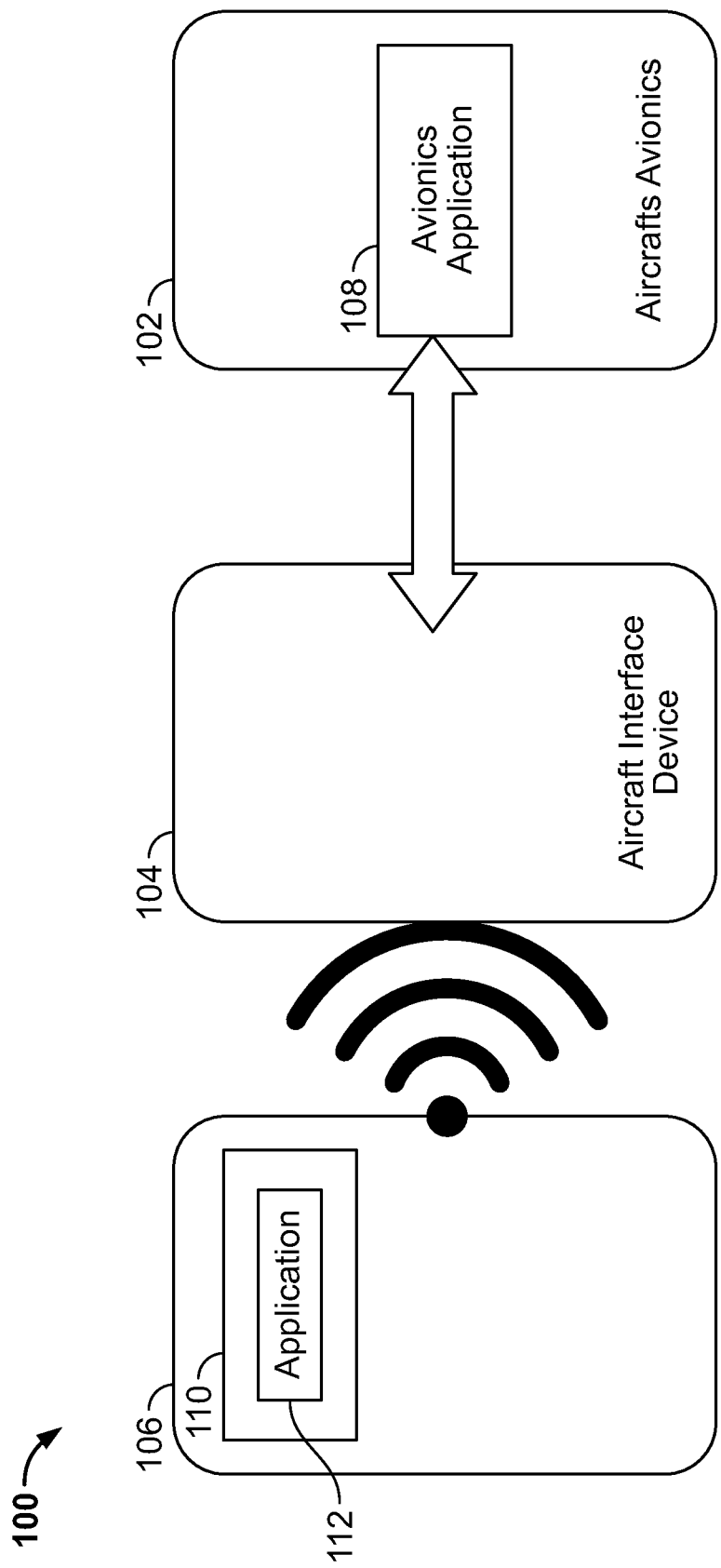
FIG. 1 depicts a functional block diagram of one embodiment of a system that facilitates communication of applications with embedded avionics.

Referring to FIG. 1, one embodiment of a system 100 is depicted and includes aircraft avionics 102, an avionics interface device (AID) 104, and a portable computing device 106. The aircraft avionics 102 may be one or more aircraft avionic systems that is running, or is at least configured to run, one or more embedded avionics applications 108. Some non-limiting examples of such avionics systems include any one of numerous control, monitoring, communication, navigation, weather, and anti-collision systems. In one particular example, the aircraft avionics 102 is implemented using at least a flight management system (FMS) that is configured to run one or more embedded flight management applications.

The AID 104, as is generally known, is a hardware platform that implements the interface between the aircraft avionics 102 and the portable computing device 106. The AID 104 may provide this interface via wired or wireless connection over a wide area network or a local network. The AID 104 may be implemented using any one of numerous AIDs now known or developed in the future.

The portable computing device 106 may be implemented using any one of numerous portable computing devices now known or developed in the future. Some non-limiting examples of presently known portable computing devices include electronic flight bags (EFB), tablet computers, notebook computers, laptop computers, and smartphones, just to name a few. Regardless of how the portable computing device 106 is specifically implemented, it includes at least one processor 110 and a computer-readable storage device or media encoded with programming instructions for configuring the portable computing device 106 to run one or more portable computing device applications 112. In one particular example, the portable computing device 106 is an EFB and the processor 110 is configured to implement one or more EFB applications. It will be appreciated that the processor 110 may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

Figure 2:
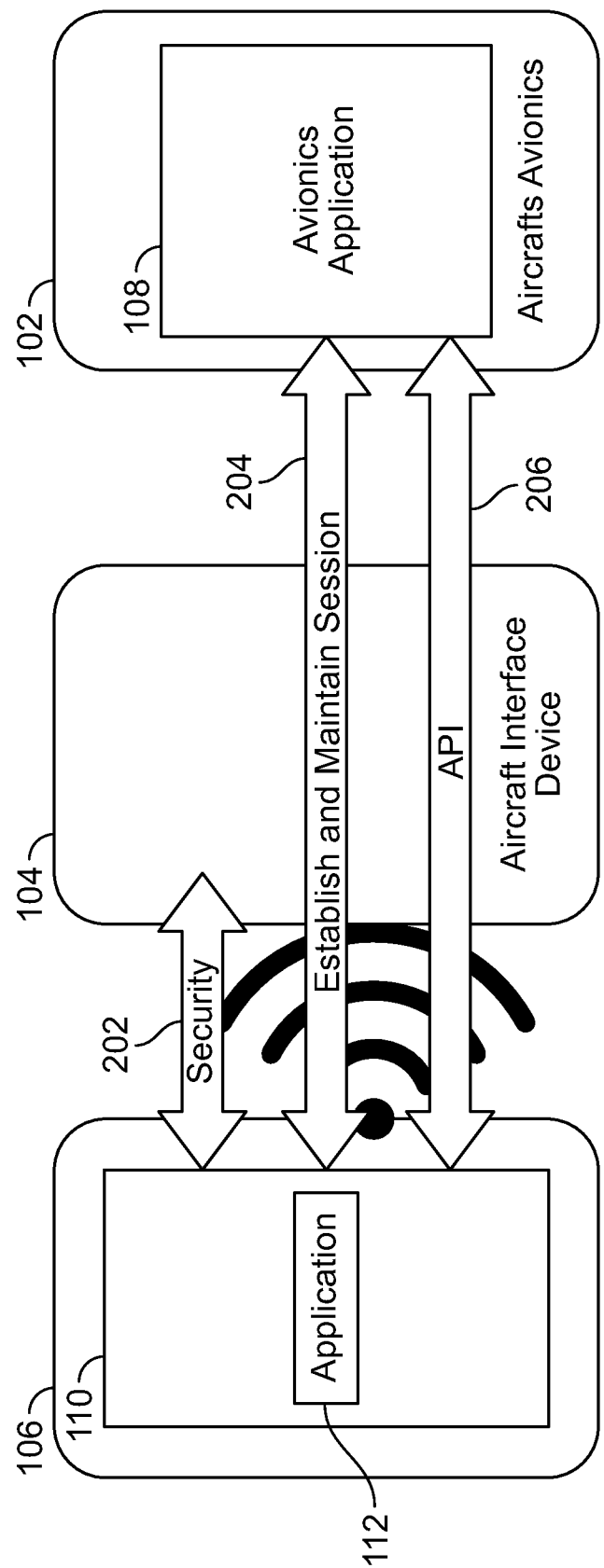
FIG. 2 depicts the complexity of connections and communications that are implemented in the system of FIG. 1.

It may be desirable for the portable device applications 112 to communicate with the embedded avionics applications 108. To do so requires a relatively complex connection and data transfer between the portable device applications 112 and avionics applications 108. As FIG. 2 depicts, the portable device application 112 must establish a secure connection 202 to the AID 104; establish and maintain the required protocol 204 with the embedded avionics application 108; and communicate with the embedded avionics application 108 as specified by an API (application programming interface) definition. It will be appreciated that in some embodiments the portable device application 112 may be configured to support multiple aircraft types and configurations. As such, it may implement various means to implement the described connection and data transfer.

Figure 3:
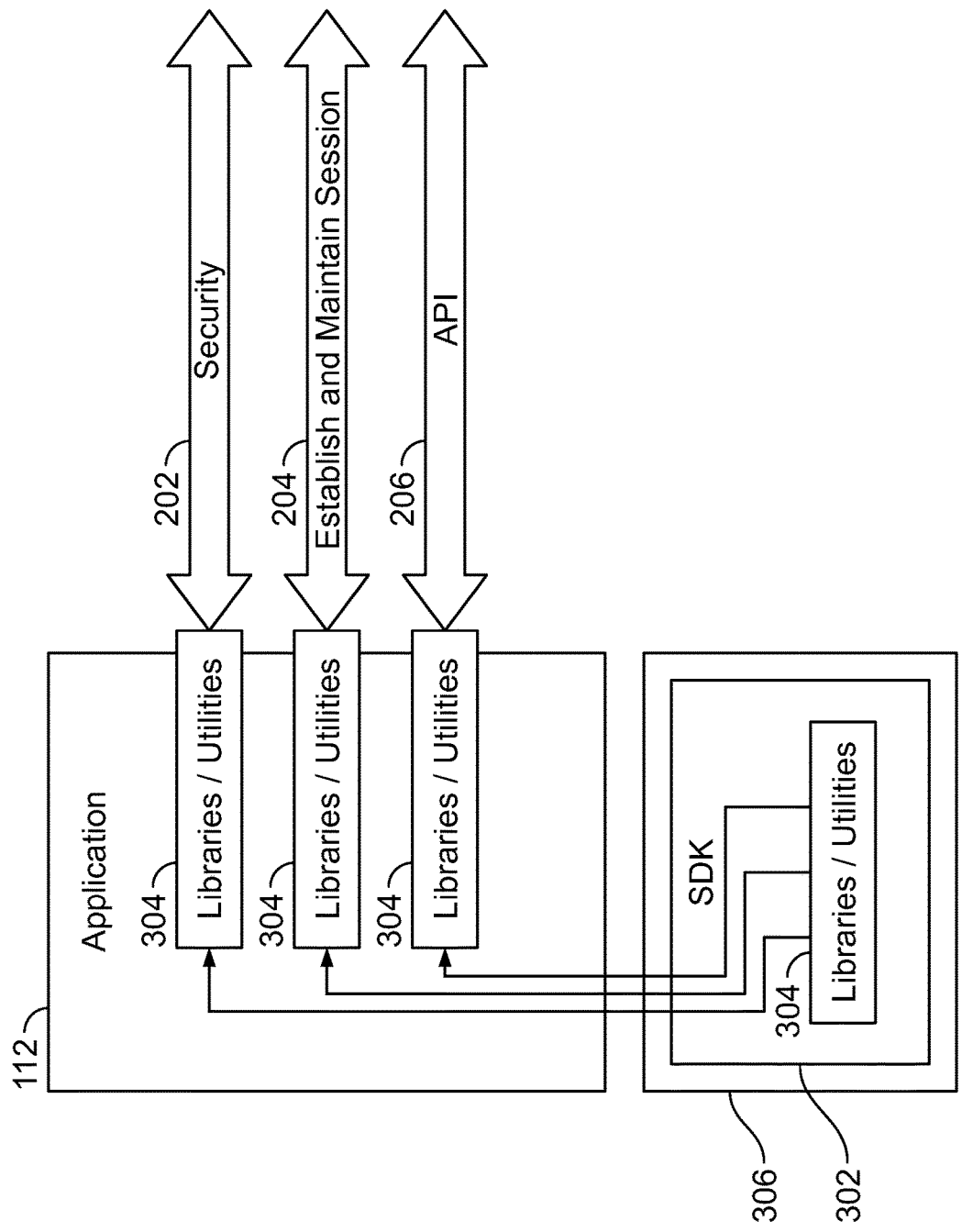
FIG. 3 depicts how applications are configured in order to facilitate the communication of applications with embedded avionics.

To facilitate and manage the above-described security, session, and API for the portable device applications 112, each portable device application 112 has resident therein a software development kit (SDK) 302 that includes a plurality of libraries and utilities 304 (see FIG. 3). The SDK 302, which may be provided on a suitable computer-readable program storage device or media 306, enables application developers to quickly develop applications that can communicate with embedded avionics applications 108 by simply embedding the libraries and utilities 304 provided by the SDK 302 (e.g., all or a subset of all provided by the SDK 302) into the portable computing device 106 to manage all the communication complexities. It will be appreciated that the computer readable storage device or media 306 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media 306 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The connection features can be provided in various forms, such as libraries or functions that are made available for the portable device applications 112 to use. The SDK 302 can provide the connection features for multiple environments such as various aircraft types and configurations. The SDK 302 can provide the connection features for any one of numerous operating systems such as, for example, IOS, Android, Linux, and Windows, just to name a few. The SDK 302 can also provide interfaces to the included libraries and utilities 304 in various languages such as, for example, C++, Python, JAVA, or SWIFT, just to name a few, or any one of numerous languages suitable for an iOS and macOS development environment.

Figure 4:
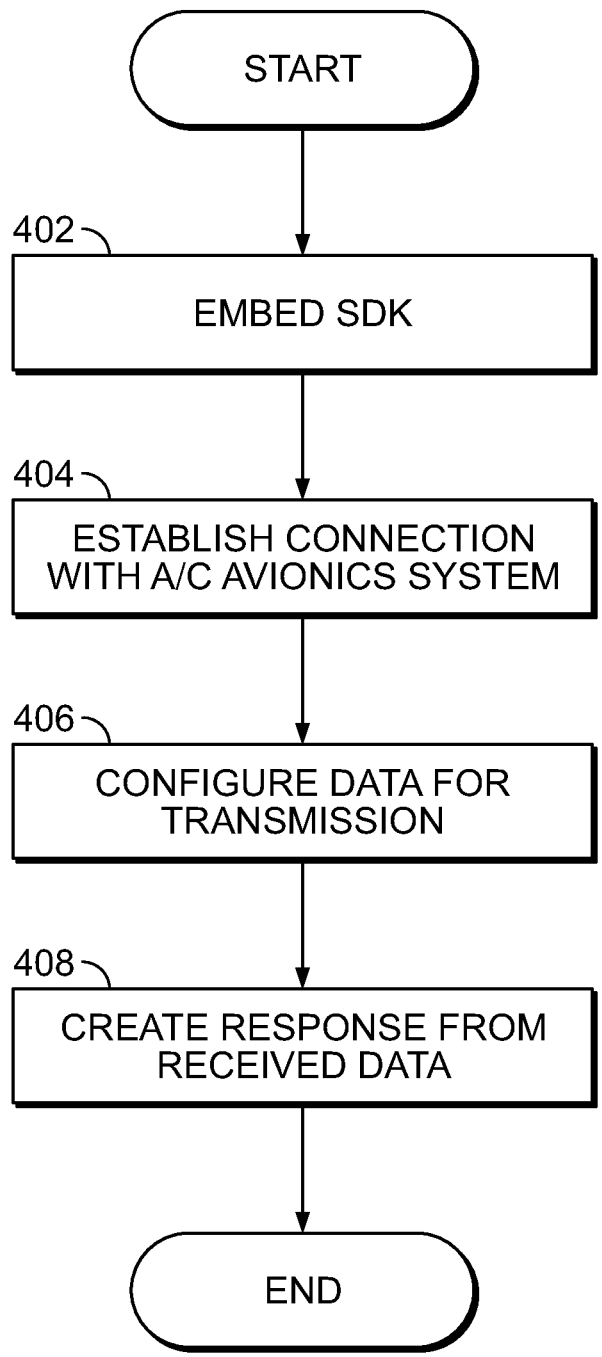
FIG. 4 depicts a flowchart of how the disclosed software development kit that is resident in a portable computing device enables the portable computing device to establish a communication connection with an aircraft avionics system.

The SDK 302 enables the functionality needed to allow portable device applications 112 to communicate with embedded avionics applications 108 resident within the aircraft avionics 102. With reference to FIG. 4, a description of the process enabled by the SDK 302 that allows the portable computing device to connect to the aircraft avionics system 102 will now be provided. The process 400 is enabled when the SDK 302 is embedded in the portable computing device 106 as pre-compiled software (402). Thereafter, the SDK 302, via a connection object, enables the portable computing device 106 to establish a secure connection with the aircraft avionics system 102 using the unique protocol that the aircraft avionics system 102 consumes (404). This secure connection can be directly with the aircraft avionics system 102, or via the aircraft interface device 104.

More specifically, the portable computing device applications 112 can access, via headers, functions resident in the SDK 302. The portable device applications 112 will "call" the appropriate function in one or more libraries of the pre-compiled SDK 302. The portable device applications 112 selectively open up, as needed, one or more libraries of the pre-compiled SDK 302. For example, when a portable device application 112 desires to connect to the aircraft avionics 102, such as the FMS, it instantiates a "connect to FMS data structure." This data structure is resident in the pre-compiled libraries 304 of the SDK 302. The portable device application 112 then calls a function on that data structure. This function is also resident in the pre-compiled library 304 of the SDK 302. The SDK 302 is invoked whenever a function from its library is called. More simply, any portable device application desiring to utilize any functionality resident in the SDK 302 must download the SDK precompiled files into the code base. As a result, the portable device applications 112 will include all the source code relevant to that portable device application 112, the precompiled libraries 304 of the SDK 302, and the header files that provide the function signatures of the SDK 302, but the not code therein.

When the secure connection is established, the SDK 302 enables the portable computing device 108 to configure data to be transmitted from the portable computing device 108 to the aircraft avionics system 102 to be compatible with the aircraft avionics system 102 (406). More specifically, the SDK 302 enables the portable computing device 108 to establish what is referred to as herein as an "Interface Contract" between the portable computing device 108 and the aircraft avionics system 102, by sending "heartbeats" (e.g. periodic signals) across the communication channel to establish a lasting session with the aircraft avionics system 102. The SDK 302 then enables the portable communication device 108 to appropriately configure any data to be transmitted.

The SDK 302 also enables the portable computing device 108 to receive, decode, and stitch together, multiple data packets transmitted from the aircraft avionics system 102, into a meaningful response from the aircraft avionics system 102 (408). For example, in those instances where the aircraft avionics system 102 is a flight management system (FMS), it is generally known that an FMS does not simply output one complete, well-formatted message. Rather, the FMS outputs multiple data packets in discrete intervals. The SDK 302 enables the portable computing device 108 to stitch these data packets together into a single API message (e.g., a JSON response). The SDK does this by decoding information in the header value that is included in each data packet. The header value defines the ID of the message, the sequence number of each packet, and the response state of each packet. All of the packets that comprise a single message have the same ID, the sequence number of each packet defines the correct order of each packet, and the response state of each packet identifies each packet as being the start, end, or middle of the complete message.

The SDK 302, when compiled and embedded in the portable computing device applications 112 resident on portable computing device 108, enables the portable computing device applications 112 to directly implement the above-described process. No server (external or internal) is contacted to implement the process. Moreover, the SDK 302 does not control disk partitioning within the portable computing device, nor does it include defined security protocols.

The system and method described herein facilitates communication of applications with embedded avionics by making the avionics connection features available in a software development kit (SDK) for application developers ease in use.

In one embodiment, a system includes an aircraft avionics system and a portable computing device. The aircraft avionics system is configured to run one or more embedded avionics applications. The portable computing device is in operable communication with the aircraft avionics system and is configured to run one or more portable device applications. Each portable device application has resident therein a software development kit having libraries and utilities that enables the portable device application to: establish a secure connection with the aircraft avionics system, establish and maintain a required protocol with the embedded avionics application, and communicate with the embedded avionics application as specified by an application programming interface definition.

These aspects and other embodiments may include one or more of the following features. An aircraft interface device in operable communication with the aircraft avionics system and the portable computing device. The software development kit may further enable the portable computing device to establish the secure connection directly with the aircraft interface device. The software development kit may further enable the portable computing device to configure data to be transmitted from the portable computing device to the aircraft avionics system to be compatible with the aircraft avionics system. The software development kit may further enable the portable computing device to receive, decode, and stitch together, multiple data packets transmitted from the aircraft avionics system. The aircraft avionics system may comprise a flight management system. The portable computing device may comprise an electronic flight bag. The portable computing device may comprise a smartphone. The software development kit may not control disk partitioning within the portable computing device. The software development kit may not include defined security protocols. The software development kit may enable the portable computing device to communicate with multiple types of aircraft avionics systems.

In another embodiment, an electronic flight bag includes a processor that is configured to run one or more electronic flight bag applications. Each electronic flight bag application has resident therein a software development kit having libraries and utilities that enable the electronic flight bag to: establish a secure connection with an aircraft avionics system that is configured to run an embedded avionics application, establish and maintain a required protocol with the embedded avionics application, and communicate with the embedded avionics application as specified by an application programming interface definition.

These aspects and other embodiments may include one or more of the following features. The software development kit may further enable the electronic flight bag to establish the secure connection directly with an aircraft interface device that is in operable communication with the aircraft avionics system. The software development kit may further enable the electronic flight bag to configure data to be transmitted to from the electronic flight bag to the aircraft avionics system to be compatible with the aircraft avionics system. The software development kit may further enable the electronic flight bag to receive, decode, and stitch together, multiple data packets transmitted from the flight management system. The software development kit may not control disk partitioning within the electronic flight bag. The software development kit may not include defined security protocols. The software development kit may further enable the electronic flight bag to communicate with multiple types of flight management systems.

In yet another embodiment, a computer-readable program product comprises a software development kit having libraries and utilities, and the software development kit, when compiled on a portable computing device that is configured to run a portable device application, is resident within the portable device application, and enables the portable computing device to: establish a secure connection with an aircraft avionics system that is configured to run an embedded avionics application, establish and maintain a required protocol with the embedded avionics application, and communicate with the embedded avionics application as specified by an application programming interface definition.

These aspects and other embodiments may include one or more of the following features. The software development kit may further enable the portable computing device to: configure data to be transmitted from the portable computing device to the aircraft avionics system to be compatible with the aircraft avionics system, and to receive, decode, and stitch together, multiple data packets transmitted from the aircraft avionics system.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system, comprising:
   an aircraft avionics system configured to run one or more embedded avionics applications; and
   a portable computing device operable to establish communication with the aircraft avionics system, the portable computing device configured to run one or more portable device applications, the portable computing device having resident therein a software development kit having libraries and utilities that, when called by one or more of the portable device applications, enables the portable computing device to:
   establish a secure connection with the aircraft avionics system,
   establish and maintain a required protocol with the embedded avionics application, and
   communicate with the embedded avionics application as specified by an application programming interface definition, and
   configure data to be transmitted from the portable computing device to the aircraft avionics system to be compatible with the aircraft avionics system.

2. The system of claim 1, further comprising:
   an aircraft interface device in operable communication with the aircraft avionics system and the portable computing device.

3. The system of claim 2, wherein the software development kit further enables the portable computing device to establish the secure connection directly with the aircraft interface device.

4. The system of claim 1, wherein the software development kit further enables the portable computing device to receive, decode, and stitch together, multiple data packets transmitted from the aircraft avionics system.

5. The system of claim 1, wherein the aircraft avionics system comprises a flight management system.

6. The system of claim 1, wherein the portable computing device comprises an electronic flight bag.

7. The system of claim 1, wherein the portable computing device comprises a smartphone.

8. The system of claim 1, wherein the software development kit does not control disk partitioning within the portable computing device.

9. The system of claim 1, wherein the software development kit does not include defined security protocols.

10. The system of claim 1, wherein the software development kit enables the portable computing device to communicate with multiple types of aircraft avionics systems.

11. An electronic flight bag, comprising:
    a processor configured to run one or more electronic flight bag applications, each electronic flight bag application having resident therein a software development kit having libraries and utilities that enable the electronic flight bag to:
    establish a secure connection with an aircraft avionics system that is configured to run an embedded avionics application,
    establish and maintain a required protocol with the embedded avionics application, and
    communicate with the embedded avionics application as specified by an application programming interface definition, and
    configure data to be transmitted from the electronic flight bag to the aircraft avionics system to be compatible with the aircraft avionics system.

12. The electronic flight bag of claim 11, wherein the software development kit further enables the electronic flight bag to establish the secure connection directly with an aircraft interface device that is in operable communication with the aircraft avionics system.

13. The electronic flight bag of claim 11, wherein the software development kit further enables the electronic flight bag to receive, decode, and stitch together, multiple data packets transmitted from the aircraft avionics system.

14. The electronic flight bag of claim 11, wherein the software development kit does not control disk partitioning within the electronic flight bag.

15. The electronic flight bag of claim 11, wherein the software development kit does not include defined security protocols.

16. The electronic flight bag of claim 11, wherein the software development kit further enables the electronic flight bag to communicate with multiple types of flight management systems.

17. A non-transitory computer-readable program product comprising a software development kit having libraries and utilities, the software development kit, when compiled on a portable computing device that is configured to run a portable device application, is resident within the portable computing device and, when called by the portable device application, enables the portable computing device to:

establish a secure connection with an aircraft avionics system that is configured to run an embedded avionics application, establish and maintain a required protocol directly with the embedded avionics application, and communicate directly with the embedded avionics application as specified by an application programming interface definition.

18. The computer program product of claim 17, wherein the software development kit further enables the portable computing device to:

configure data to be transmitted from the portable computing device to the aircraft avionics system to be compatible with the aircraft avionics system; and receive, decode, and stitch together, multiple data packets transmitted from the aircraft avionics system.

\* \* \* \* \*